Patented July 25, 1939

2,167,348

UNITED STATES PATENT OFFICE 2,167,348

PROCESS FOR BREAKING PETROLEUM EMULSIONS

Melvin De Groote, University City, and Bernhard Keiser and Charles M. Blair, Jr., Webster Groves, Mo., assignors, by mesne assignments, to Petrolite Corporation, Ltd., a corporation of Delaware No Drawing. Application May 9, 1938, Serial No. 206,903

7 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottom of oil storage tanks, and are commonly referred to as "cut oil", "roily oil", "emulsified oil", and "bottom settlings".

The object of our invention is to provide a novel and inexpensive process for separating emulsions of the character referred to into their component parts of oil and water or brine.

Briefly described, our process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment, or is subjected to other equivalent separatory procedures.

The treating agent or demulsifying agent contemplated by our process consists of or comprises an amine of the kind hereinafter described. Said demulsifying agent may be in the form of the amine itself or in the form of the amine base derived by contact with water or in the form of a salt. The particular amine employed in the present process is characterized by the fact that it is derived from a non-fatty monobasic carboxy detergent-forming acid, such as various naphthenic acids, chlornaphthenic acids, abietic acid, hydrogenated abietic acid, and the like. The composition of the compound is such that the acid radical or residue (the oxy-acyl radical) is attached to the nitrogen atom of the amine through a carbon atom chain, which carbon atom chain is in turn alkyl, aryl, or alicyclic in nature. The composition and method of manufacturing same will be subsequently described in detail.

It is well known that there are available a number of non-fatty, monobasic carboxy, detergent-forming acids which act in a manner comparable to the higher fatty acids in some instances. The naphthenic acids are derived from various petroleums or are obtained by treatments which involve oxidation of hydrocarbon bodies present in naturally-occurring crude oils. The number of carbon atoms in naturally-occurring naphthenic acids may vary from 10 carbon atoms to 38 carbon atoms. Similarly, it is known that such naphthenic acids can be treated, for example, with halogens so as to produce derivatives such as chlornaphthenic acids. Somewhat similar materials are derived from rosin or resinic acids. Such materials will also vary in molecular weight, and in any event will be within the carbon atom range previously indicated. These materials are referred to as detergent-forming because when treated with alkalies, they yield soap or soap-like materials. They are referred to as monobasic carboxy acids in order to differentiate them from such materials as are obtained by the sulfonation of naphthenic acids or carboxy abietene. The acids or suitable derivatives thereof, such as the esters derived from monohydric, dihydric, or trihydric alcohols, may be reacted with the selected tertiary hydroxy amines to give reagents of the kind employed in the present process for resolving oil field emulsions. Not only may carboxy acids and their esters be employed, but also suitable derivatives such as the acyl chlorides, or the anhydrides, and in fact any form is suitable, which supplies the acyl radical of the selected acid.

In order to clearly point out how the reagents employed in the present process are different from various other nitrogenous products, and particularly various related amines and amides, it may be well to briefly indicate certain reactions involving carboxy acids and amines. In the case of primary or secondary amines, the reactions may be indicated as follows:

(A) Salt formation

R.COOH+R'NHH→[HHR'N.H]OOC.R (B) Amide formation

R.COOH+HR'NH→RCO.NR'H (C) The third type of reaction involves the organic acid in the form of a salt so as to produce amino organic acids.

(D) Still another type of reaction involves organic acids and a tertiary alkylolamine or its functional equivalent, such as a tertiary hydroxy-alicyclic amine. Such reaction may be indicated in the following manner:

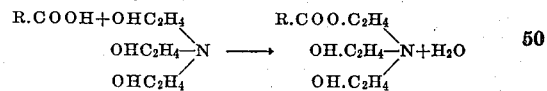

We have discovered that if the esters of the acids of the kind specified or their functional equivalents of the kind described previously, are reacted with hydroxy tertiary amines, one obtains materials of the kind characterized by the fact that the organic acid radicals are present in the amine compound in an esterified form. As to the production of amines employed in the present process, it is interesting to note that the products are well-known compositions of matter and that the methods employed for producing the same are well-known and do not require further elaboration, except to indicate that there is more descriptive matter in the literature concerned with the production of such amines from fatty acids than from non-fatty detergent acids. However, the same methods of manufacture which employ fatty acids or esters or other derivatives thereof, can be adapted in connection with the production of materials from naphthenic acids, abietic acids, etc.

It may be well, however, to point out that the production of these materials in absence of amine salts is apparently broadly new. Attention is directed to our copending application, Ser. No. 180,993, filed December 21, 1937. It is believed that to the extent the materials are produced from naphthenic acids, abietic acids, or the like, in ester form, i. e., for example from methyl naphthenate, methyl abietate, ethylene glycol dinaphthenate, ethylene glycol diabietate, naphthenin, abietin, etc., that the products being free from the amine salts represent substantially new compositions of matter.

If the selected acid is considered at R.COOH, then for convenience triethanolamine may be considered as the selected tertiary hydroxyamine. Esterification reactions produce compositions of matter indicated by the following formulas:

$$\begin{array}{c} R.COO.C_2H_4 \\ OH.C_2H_4\text{---}N \\ OH.C_2H_4 \end{array}$$

$$\begin{array}{c} R.COO.C_2H_4 \\ R.COO.C_2H_4\text{---}N \\ OH.C_2H_4 \end{array}$$

$$\begin{array}{c} R.COO.C_2H_4 \\ R.COO.C_2H_4\text{---}N \\ R.COO.C_2H_4 \end{array}$$

However, if the selected organic acid, for instance, abietic acid or naphthenic acid, is converted into the corresponding triglyceride, i. e., naphthenin or abietin, then such triglyceride enters the desired reaction just as effectively and possibly even more effectively, than the organic acid itself. The reactions taking place in varying proportions with the glyceride may be indicated in the following manner:

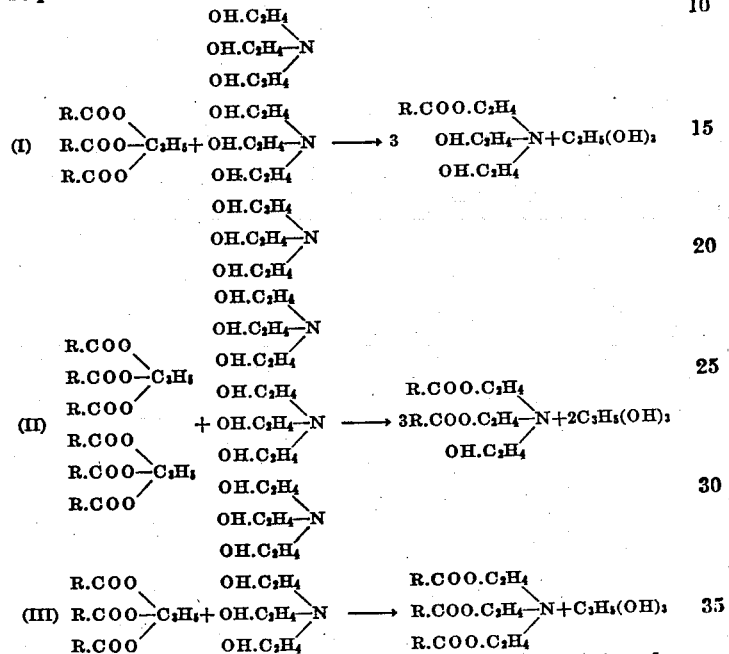

The manufacture of these compounds is relatively simple. For example, the selected organic acid or its ester, and the selected hydroxy tertiary amine are mixed in suitable proportions and heated at some point above the boiling point of water, for instance, 110° C.; and at a point below the decomposition point of the amine or organic acid, for instance, 180° C.; for a suitable period of time, such as two to eight hours. Mild agitation is employed. If the organic acids are used in ester form, then it may be desirable to use a catalyst, such as sodium oleate, sodium carbonate, caustic soda, etc. Such catalysts may be present to the extent of one-half of 1% or less. It has been previously pointed out that other functional equivalents can be employed with equal facility. It is to be noted that the reactions above described do not take place to any appreciable extent if the organic acid has been converted into the soap or salt. Such salts are not functional equivalents.

It is to be remembered that the reactions take place in any event under conditions which are substantially anhydrous. In other words, if water is formed in an esterification reaction, such as one involving one mole of stearic acid and one mole of triethanolamine, it is driven off or eliminated immediately because the temperature of reaction is above the boiling point of water. Naturally under such circumstances there is no objection to passing a dry inert gas through the mixture to hasten esterification.

Four additional facts must be borne in mind in regard to these compounds. In the first place, these amines which are employed as demulsifying agents in the present process are not quaternary ammonium bases or salts thereof. The expression "quaternary ammonium" is properly and conventionally applied to compounds in which all four hydrogen atoms of the ammonium radical NH$_4$ have been replaced by a hydrocarbon radical or oxy-hydrocarbon radical as, for example, in trimethyl phenyl ammonium hydroxide.

Secondly, an important characteristic which must be recognized is that these amine compounds are not amides. It has been previously pointed out that an amide formation involves a product in which there is a direct linkage between the carboxylic carbon atom and the nitrogen atom in the amine. This is not the case in the compounds employed as demulsifying agents in the present process.

In the third place, it must be recognized that these compounds are derived only from basic tertiary amines. The word "basic" is employed to exclude amines having little or no basicity such as the ordinary aromatic amines or any amine having at least one aryl radical directly joined to the amino nitrogen atom. For this reason, these amine products which are herein contemplated as demulsifying agents and which necessarily are characterized by freedom from any aryl groups as such, cannot be derived from aryl amines. They are derived solely from alkyl, alicyclic, or aralkyl amines having at least one hydroxyl group present. It is true that in the arakyl amines there is an aryl group present, but it is not directly attached to the nitrogen atom as in the case of aryl amines but in fact represents nothing more or less than a substituted alkylamine. For instance, we consider benzylamine as being the primary amine, phenmethyl amine.

Finally, it must be recognized that these materials have not lost any basicity in the forms of the esterified amine and that they exhibit all the properties of a basic amine, that is, they combine with water to form a base presumably a substituted ammonium compound, but not a quaternary ammonium compound insofar that there is always one unsubstituted hydrogen atom of the ammonium radical present. They combine with various acids to form salts. For example, they may be combined with acetic acid, hydrochloric acid, lactic acid, chloracetic acid, nitric acid, butyric acid, phosphoric acid, oxalic acid, or any suitable organic or inorganic acid, to form salts. It is understood that the reference in the specification and appended claims to the amines includes the basic form and the acid salts as well as the amines themselves. The characteristic demulsifying properties are contributed by the amine, and it is immaterial whether they may be considered as being in any one of the three following forms:

$$(T)_3N$$

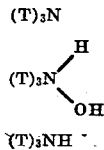

$$(T)_3NH \cdot \overset{\cdot}{X}$$

in which T represents the substituents of the amino hydrogen radicals of the parent ammonia from which all amines are hypothetically derived and X simply represents the acid radical of any acid employed.

In referring to the amines derived by reactions involving organic acids of the kind described and triethanolamine, it is to be noted that the products may be characterized by the following formula:

$$\left[ \begin{matrix} (R.COO.C_nH_{2n})_m \\ (OH.C_nH_{2n})_{m'} \end{matrix} \right] N$$

in which $m$ is 1, 2, or 3, $m'$ is 0, 1, or 2, with the proviso that $m+m'=3$, and $n$ denotes any small whole number, preferably less than 10, and in the case of triethanolamine, denotes the number 2.

If instead of employing triethanolamine, ethyl diethanolamine, or a similar amine were employed, then the resulting products would be indicated by the following type formula:

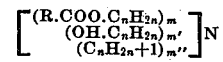

in which $m$ is 1 or 2, $m'$ is 0 or 1, $m''$ is 1, with the proviso that $m+m'+m''=3$; and $n$ has the same significance as above.

In event that diethylaminoethanol were employed, it is manifest that another variation of the above formula would appear. It is also possible to obtain compounds from such materials as acetylated triethanolamine in which the acetyl radical has replaced one hydrogen atom of one of the hydroxy ethyl radicals. Acetic acid in this instance may be considered typical of the lower fatty acids which have less than 7 carbon atoms. If such monoacetylated triethanolamine were employed, the reaction product would be indicated by the following type formula:

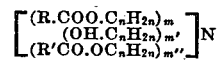

in which $m$ is 1 or 2, $m'$ is 0 or 1, $m''$ is 1 or 2, and $n$ has the same significance as above with the added proviso that $m+m'+m''$ must be equal to 3.

In the above formula R'.CO indicates an acyl radical derived from a low molecular weight fatty acid having less than 7 carbon atoms. Attention is directed to the fact that the divalent aliphatic radical indicated by $C_nH_{2n}$ may be a radical such as a $C_2H_4$ radical, $C_3H_6$ radical, $C_4H_8$ radical, $C_5H_{10}$ radical, or it may be an alicyclic radical or an aralkyl radical, as will become obvious from the kind of amines subsequently enumerated. Furthermore, where the radical $C_nH_{2n+1}$, which is a typical alkyl radical, appears, it may be a methyl radical, ethyl radical, propyl radical, butyl radical, amyl radical, hexy radical, octyl radical, etc. On the other hand, instead of being a monovalent alkyl radical, it may be a monovalent alicyclic radical such as a cyclohexyl radical, or it may be an aralkyl radical, such as a benzyl radical. In the claims appended hereto, it is understood that the expression "alkylol" includes the hydroxy hydrocarbon radicals whether derived from alkyl, alicyclic, or aralkyl radicals. It is furthermore understood in the hereto appended claims that the expression "hydroxy alkyl" includes hydroxy alicyclic as well as hydroxy aralkyl radicals, provided that in the latter the hydroxyl group is attached to the aliphatic side chain. Attention is also directed to the fact that the tertiary amines involving the dihydroxy propyl radical $C_3H_5(OH)_2$ may substitute for the hydroxy alkyl radicals of the kind described. It is also understood that the alkyl-oxy-alkyl radicals are the equivalent of an ordinary alkyl radical, insofar that they might appear in products such as the trihydroxy ethyl ether of triethanolamine which may be indicated by the following formula:

$$N(C_2H_4OC_2H_4OH)_3$$

Such material would be the obvious functional equivalent of triethanolamine in reactions of the kind contemplated in the manufacture of the demulsifying agents employed in the present process.

The amine employed as a demulsifying agent in the present process might be indicated by the following formula:

in which $m$ is 1, 2, or 3, $m'$ is 0, 1, or 2, with the proviso that $m+m'=3$, T is an alkyl radical or a radical of the type (R'.COO.alkyl) or a hydroxy alkyl radical, and R'.COO represents an acid radical having less than 7 carbon atoms. The expression "alkyl" is used in the broad sense previously specified, and it is also to be repeated that the amine may be in the form of the base or in the form of a salt.

Suitable bases which may be reacted with naphthenic acids, abietic acids, or the like, to produce the reagents of the kind employed in the present process include: triethanolamine, diethanolalkylamines, such as diethanol ethylamine, diethanol propylamine, etc.; tertiary glyceryl amines such as monoglyceryl diethylamine, monoglyceryl dipropylamine, diglyceryl propylamine, triglycerylamine, etc. Other examples include diethanol methylamine, tripropanolamine, dipropanol methylamine, cyclohexanol diethanolamine, dicyclohexanol ethanolamine, cyclohexyl diethanolamine, dicyclohexyl ethanolamine, dicyclohexanol ethylamine, benzyl diethanolamine, dibenzylethanolamine, benzyl dipropanolamine, tripentanolamine, trihexanolamine, ethyl hexyl ethanolamine, octadecyl diethanolamine, polyethanolamine, etc.

In indicating the various hydroxylated tertiary amines of the non-aryl type which may be employed to produce the amine contemplated as the demulsifying agent of the present process, it is desirable to indicate that amines of the type where a hydroxy acyl radical replaces a hydrogen atom of the hydroxyl radical of the hydroxy tertiary amine, are not included within the broad class of hydroxy tertiary amines unless there is another hydroxyl radical attached to the usual alkyl radical. For instance, if diethyl amino ethanol is treated with lactic acid so as to form lactyl ethanol diethylamine of the following formula:

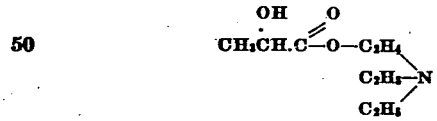

then it is understood that such materials would not represent a hydroxy tertiary amine within the meaning or scope as herein employed. If, on the other hand, triethanolamine were treated with lactic acid so as to give monolactyl triethanolamine of the following composition:

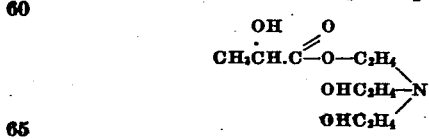

then such compound would be included due to the presence of one or more hydroxyl radicals attached to the alkyl radicals.

It is our preference to prepare the demulsifying agents contemplated by our invention from naphthenic acids or mixtures of naphthenic acids of the kind which are readily available in the open market. For instance, one can readily procure a naphthenic acid or mixtures of naphthenic acids having a molecular weight not less than 200 and not over 575, having a mean molecular weight of approximately 225, and having a distillation range varying from approximately 230° C. to 310° C. A typical distillation range is shown in the following table:

| | Degrees C. |
|---|---|
| 10% | 230 |
| 20% | 255 |
| 30% | 268 |
| 40% | 273 |
| 50% | 278 |
| 60% | 279 |
| 70% | 287 |
| 80% | 292 |
| 85% | 292 |
| 100% | 310 |

These naphthenic acids should be soluble in 65% ethyl alcohol when 10% naphthenic acid is added, but they should be insoluble when only 5% is added. The selected naphthenic acids should show no substantial iodine number. When an iodine number determination is made by the Hubl-Waller method, they should not show an iodine number greater than 2 or 3. The saponification number should be in the neighborhood of 250. The specific gravity at 77° F. should be about 0.9635.

Naphthenic acids of the kind described are readily esterified with glycerine to give naphthenin. Such product depends on intimate mixture and agitation in presence of dried hydrochloric acid gas. The procedure is substantially the same as the formation of stearin from stearic acid in glycerol. Such naphthenin has a molecular weight of about 703.

Example I

Naphthenin of the kind previously described in detail is employed. For convenience, its molecular weight is considered as being 700. Commercial triethanolamine and naphthenin in the proportion of one mole of naphthenin to three moles of triethanolamine are heated at a temperature between 150° and 180° C. for 2 hours. Mild agitation is employed. The reaction product so obtained may be used as such or may be converted into the acetate by the addition of the maximum amount of glacial acetic acid, which can be added without causing acidity to methyl orange indicator. Generally speaking, this requires about three moles of glacial acetic acid, which can be added without causing acidity to methyl orange indicator.

Example II

Triglycerylamine (tri-dihydroxy propylamine) is substituted for triethanolamine in Example I.

Example III

Diamyl monoglycerolamine (1-di-amyl amino propane 2,3, diol) is substituted for triethanolamine in Example I.

Example IV

Dicyclohexylamine is reacted with glycerol monochlorhydrin to give monoglyceryl dicyclohexylamine. This product is substituted for triethanolamine in Example I.

Example V

Dibenzylamine is reacted with glycerol monochlorhydrin to produce monoglyceryl dibenzylamine. This product is substituted for triethanolamine in Example I.

Example VI

Polyethanolamine:

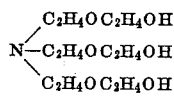

is substituted for triethanolamine in Example I.

Example VII

Abietin, which is available commercially as neutral ester or neutral gum is substituted for naphthenin in Examples I–VI inclusive.

Example VIII

Naphthenic acids of the kind previously described are treated with chlorine until the comparable dichlor compounds are formed. These chlorinated naphthenic acids are then converted into the triglyceride form as before, and this material so obtained is substituted in Examples I–VI inclusive instead of naphthenin.

We desire to emphasize that the products obtained in the above examples may be used in the form of the amine by direct contact with an emulsion without contact with water. They may be contacted with water, that is, used in the form of a solution so as to produce in a greater or lesser degree the amine base. Furthermore, any of the products above described may be combined with suitable acid. Acetic acid may be employed. Hydrochloric acid is particularly desirable. In some instances, acids such as oleic acid or naphthenic acid may be employed to give a suitable salt.

In examining the method of manufacture of these compounds as previously described, it is apparent that certain byproducts appear such as glycerine, mono- or di-glycerides, etc. From a practical standpoint it is unnecessary to separate these cogeneric materials, though it would be possible to do so by conventional processes. It is quite possible that these materials which appear as a part of the reaction mass contribute to a greater or lesser degree to the demulsifying power of the amine body. It may be that some of these materials which appear in the reaction mass cannot be completely identified as to their form. For instance, it is at once possible to see that condensation products might be formed under proper conditions between amines of the kind contemplated as demulsifying agents in the present process and either glycerol or triethanolamine, by virtue of an ether linkage. In view of this fact, in the appended claims the demulsifying agent will not only be described in terms of the chemical structure of the amine, but also in terms of the method of manufacture. The purpose of the claims which are characterized by reference to the method of manufacture is to specifically include the general reaction mass produced in the manufacture of the amine bodies.

It is well known that non-fatty detergent-forming acids can be modified so that the resultant products are still monobasic. Reference has already been made to chlorinated materials, etc. Hydrogenated abietic acid may, of course, be employed as readily as abietic acid. In these instances, the modified acid still acts as the functional equivalent of the unmodified acid for the purposes such as the reactions indicated in describing the manufacture of the demulsifying agents used in the present invention. It is to be noted that the introduction of a chlorine atom, a bromine atom, an iodine atom, or an alkyl radical, for example, does not result in converting a monobasic acid into a polybasic acid. It is not intended that functional modification shall include such derivatives as obtained by treating naphthenic acid with strong sulfonating agents so as to obtain sulfo naphthenic acid or any similar compounds which result in the introduction of a radical having an ionizable hydrogen atom; or in other words, converting the monobasic acid into a polybasic acid.

One should not lose sight of the fact, however, that the present invention is concerned particularly with the employment of certain chemical compounds of definitely stated composition which are present in significant or predominant amounts in the mixtures obtained by the reactions described. Needless to say, the employment of the selected demulsifying agents in the art of breaking crude oil emulsions is not limited to any particular method of manufacture except in the appended claims, in which specific reference is made to manufacturing procedure.

Attention is directed to the fact that the word "amidification" has been applied to the reaction involving the replacement of an amino hydrogen radical by an acyl radical without limitation to a reaction involving ammonia. The replacement of the amino hydrogen atom of a primary amine or a secondary amine by an acyl radical has been considered as being amidification rather than the formation of a substituted amide or the formation of an imide or substituted imide. Such departure from conventional nomenclature has been for purposes of simplicity and to show the similarity between certain reactions.

Conventional demulsifying agents employed in the treatment of oil field emulsions are used as such, or after dilution with any suitable solvent, such as water, petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc. may be employed as diluents. Miscellaneous solvents, such as pine oil, carbon tetrachloride, sulfur dioxide extract obtained in the refining of petroleum, etc. may be employed as diluents. Similarly, the material or materials employed as the demulsifying agent of our process may be admixed with one or more of the solvents customarily used in connection with conventional demulsifying agents. Moreover, said material or materials may be used alone or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited water solubility and relatively limited oil solubility. However, since such reagents are sometimes used in a ratio of 1 to 10,000 or 1 to 20,000, or even 1 to 30,000, such an apparent insolubility in oil and water is not significant, because said reagents undoubtedly have solubility within the concentration employed. This same fact is true in regard to the material or materials employed as the demulsifying agent of our process.

We desire to point out that the superiority of the reagent or demulsifying agent contemplated in our process is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practicing our process, a treating agent or demulsifying agent of the kind above described is brought into contact with or caused to act upon the emulsion to be treated, in any of the various ways or by any of the various apparatus now generally used to resolve or break petroleum emulsions with a chemical reagent, the above procedure being used either alone or in combination with other demulsifying procedure, such as the electrical dehydration process.

Having thus described our invention, what we claim as new and desire to secure by Letters Patent is:

1. A process for breaking petroleum emulsions of the water-in-oil type, characterized by subjecting the emulsion to the action of a demulsifying agent comprising a composition of matter derived by reaction, under substantially anhydrous conditions, between the ester of a non-fatty monobasic carboxy detergent-forming acid and a non-aryl tertiary hydroxy amine within the molal ratio of 1:1 and 1:3, at a temperature above the boiling point of water and below the point of decomposition; said reaction being conducted in a manner to yield a substantial quantity of a basic material in which the non-fatty monobasic carboxy detergent-forming acid radical is attached to the basic nitrogen atom through a carbon atom chain with the added proviso that in said basic material the ratio of said acid radical to the amino nitrogen atom shall be at least 1:1 and not more than 3:1; and said basic material being further characterized by absence of amide and polyamino radicals.

2. A process for breaking petroleum emulsions of the water-in-oil type characterized by subjecting the emulsion to the action of a demulsifying agent comprising a composition of matter derived by reaction, under substantially anhydrous conditions, between the ester of a non-fatty monobasic carboxy detergent-forming acid and triethanolamine within the molal ratio of 1:1 and 1:3, at a temperature above the boiling point of water and below the point of decomposition; said reaction being conducted in a manner to yield a substantial quantity of a basic material in which the non-fatty monobasic carboxy detergent-forming acid radical is attached to the basic nitrogen atom through a carbon atom chain with the added proviso that in said basic material the ratio of said acid radical to the amino nitrogen atom shall be at least 1:1 and not more than 3:1; and said basic material being further characterized by absence of amide and polyamino radicals.

3. A process for breaking petroleum emulsions of the water-in-oil type, characterized by subjecting the emulsion to the action of a demulsifying agent comprising a composition of matter derived by reaction, under substantially anhydrous conditions, between the ester of a naphthenic acid and triethanolamine within the molal ratio of 1:1 and 1:3, at a temperature above the boiling point of water and below the point of decomposition; said reaction being conducted in a manner to yield a substantial quantity of a basic material in which the non-fatty monobasic carboxy detergent-forming acid radical is attached to the basic nitrogen atom through a carbon atom chain with the added proviso that in said basic material the ratio of said acid radical to the amino nitrogen atom shall be at least 1:1 and not more than 3:1; and said basic material being further characterized by absence of amide and polyamino radicals.

4. A process for breaking petroleum emulsions of the water-in-oil type, characterized by subjecting the emulsion to the action of a demulsifying agent comprising a chemical compound of the type indicated by the formula:

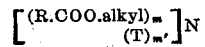

in which $m$ is 1, 2, or 3, $m'$ is 0, 1, or 2, with the proviso that $m+m'=3$, T is selected from the class consisting of alkyl radicals, or radicals of the type (R'.COO.alkyl) and hydroxy alkyl radicals, R.COO represents a non-fatty monobasic carboxy detergent-forming acid radical, and R'.COO is an acid radical having less than seven carbon atoms.

5. A process for breaking petroleum emulsions of the water-in-oil type, characterized by subjecting the emulsion to the action of a demulsifying agent comprising a chemical compound of the type indicated by the formula:

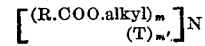

in which $m$ is 1 or 2, and $m'$ is 1 or 2, with the proviso that $m+m'=3$, T is a hydroxy alkyl radical, and R.COO is a non-fatty monobasic carboxy detergent-forming acid radical.

6. A process for breaking petroleum emulsions of the water-in-oil type, characterized by subjecting the emulsion to the action of a demulsifying agent comprising a chemical compound of the type indicated by the formula:

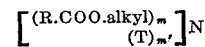

in which $m$ is 1 or 2, and $m'$ is 1 or 2, with the proviso that $m+m'=3$, T is a hydroxy ethyl radical, and R.COO is a non-fatty monobasic carboxy detergent-forming acid radical.

7. A process for breaking petroleum emulsions of the water-in-oil type, characterized by subjecting the emulsion to the action of a demulsifying agent comprising a chemical compound of the type indicated by the formula:

in which $m$ is 1 or 2, and $m'$ is 1 or 2, with the proviso that $m+m'=3$, T is a hydroxy ethyl radical, and R'.COO is a naphthenic acid radical.

MELVIN DE GROOTE.
BERNHARD KEISER.
CHARLES M. BLAIR, Jr.